(12) United States Patent
Yamamoto

(10) Patent No.: US 6,736,505 B2
(45) Date of Patent: May 18, 2004

(54) PROGRESSIVE POWER SPECTACLE LENS

(75) Inventor: Chikara Yamamoto, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/337,377

(22) Filed: Jan. 7, 2003

(65) Prior Publication Data

US 2003/0128331 A1 Jul. 10, 2003

(30) Foreign Application Priority Data

Jan. 7, 2002 (JP) ........................................ 2002-000268

(51) Int. Cl.$^7$ ................................................ G02C 7/06
(52) U.S. Cl. ...................................... 351/169; 351/177
(58) Field of Search .............................. 351/168–172, 351/177

(56) References Cited

U.S. PATENT DOCUMENTS

| | | | |
|---|---|---|---|
| 4,640,593 A | 2/1987 | Shinohara | 351/169 |
| 4,988,182 A | 1/1991 | Takahashi et al. | 351/169 |
| 5,210,553 A | 5/1993 | Barth et al. | 351/169 |
| 5,719,657 A | 2/1998 | Izawa et al. | 351/169 |
| 6,213,603 B1 * | 4/2001 | Altheimer et al. | 351/169 |
| 6,354,704 B2 | 3/2002 | Yamamoto | 351/169 |

FOREIGN PATENT DOCUMENTS

| | | |
|---|---|---|
| GB | 2338081 | 12/1999 |
| JP | 5958415 | 4/1984 |
| JP | 1221722 | 9/1989 |
| JP | 4500870 | 2/1992 |
| JP | 8136868 | 5/1996 |

OTHER PUBLICATIONS

Shirayanagi, "Development of Thin Aspheric Design Progressive Power Lens 'Joyas'", Japanese Journal of Ophthalamic Science and Technology, vol. 1, pp. 43–48, with English Language Translation.

* cited by examiner

Primary Examiner—Scott J. Sugarman
(74) Attorney, Agent, or Firm—Greenblum & Bernstein, P.L.C.

(57) ABSTRACT

A progressive power spectacle lens has a progressive power surface on at least one of a front surface and a back surface of the spectacle lens. The progressive power surface includes a distance portion corresponding to a long-distance view, a near portion corresponding to a short-distance view and an intermediate portion between the distance portion and the near portion, a refracting power gradually changes in the intermediate portion between the distance portion and the near portion. In such a spectacle lens, a shape of the progressive power surface along a main meridian is formed not to be umbilical, and the distance portion is formed to include an area where quantity of surface astigmatism decreases from a position on the main meridian to a predetermined position farther from the main meridian in the horizontal direction, the surface astigmatism then increasing at positions farther, in the horizontal direction, from the predetermined position.

8 Claims, 7 Drawing Sheets

PROGRESSIVE POWER SPECTACLE LENS

BACKGROUND OF THE INVENTION

The present invention relates to a progressive power spectacle lens having both a distance portion and a near portion.

FIG. 9 schematically shows an example of a conventional progressive power spectacle lens having a distance portion 1 and a near portion 3. As shown in FIG. 9, in this example, the distance portion is located on an upper area, the near portion is located on the lower portion, and at an intermediate portion 2 therebetween, a power is progressively changes depending on a location between the distance portion and the near portion. Conventionally, both of a lens formed with a progressive power surface on an outer side surface (i.e., an object side surface: a front surface) and a lens formed with a progressive power surface on its inner surface (i.e., an eye side surface: a back surface) have been known. In such a progressive power lens, astigmatism AS is defined as follows:

$$AS = Dmax - Dmin$$

where,

Dmax represents a maximum sectional surface power; and

Dmin represents a minimum sectional surface power.

In the spectacle lenses such as the progressive power spectacle lenses, it is desirable that the lens is as thin as possible, and that the lens has less astigmatism on a main meridian MM' which is a virtual line (linear or curved line) passing the center of the lens and extending substantially in an up-and-down direction in FIG. 9. When a person wearing a spectacle sees an object at a long distance and an object at a short distance, a line of sight passes along the main meridian MM'. Preferably, there is no astigmatism along the main meridian MM'.

In the conventional progressive power lens, in order to suppress the astigmatism on the main meridian MM', a relatively deep base curve is employed as a base curve of the progressive lens surface.

A point on the surface of the lens where the astigmatism is zero can be regarded as an infinitesimal spherical surface and is generally called an "umbilical point". A row of successive "umbilical points" is called an "umbilical meridian", and, in the conventional progressive power lens, the main meridian MM' is formed to be the umbilical meridian (i.e., there is no astigmatism on an any point on the main meridian MM').

In order to fabricate a thin progressive power lens, a relatively shallow base curve is to be employed for the progressive surface. However, if the base curve is excessively shallow, and the shape thereof along the main meridian is formed to be the umbilical meridian, astigmatism, which cannot be negligible, is generated on the main meridian. Further, in such a configuration, an area within which a clear vision having less astigmatism (hereinafter referred to as a clear vision area) becomes very narrow.

For example, if a progressive power lens whose SPH (vertex power) is −4.00D and addition power is 2.00D is fabricated as a lens having a base curve of 2.00D, which is relatively shallow for this addition power, and the shape of the progressive surface along the main meridian is the umbilical meridian, the obtained lens has a characteristic as shown in FIG. 10.

As shown in FIG. 11., there is substantially no surface astigmatism on the main meridian MM'.

Figure 13:
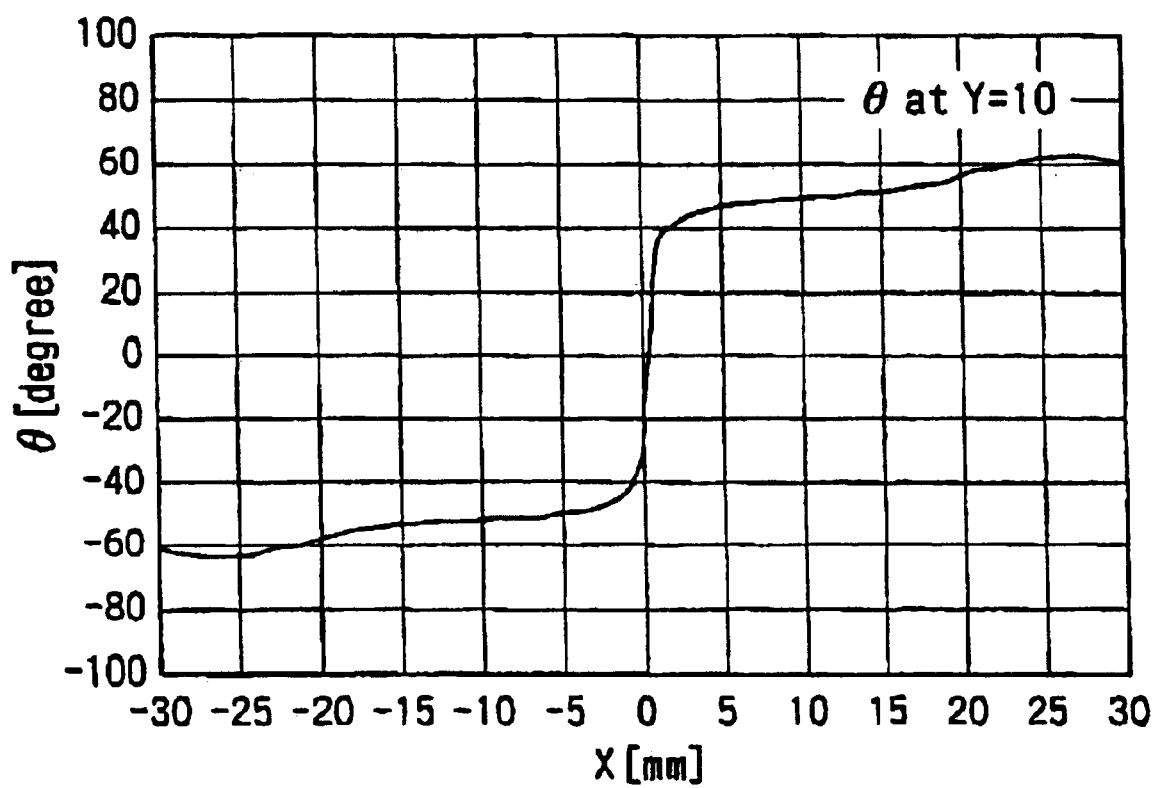

FIG. 13 is a graph showing variation of a minimum sectional surface power direction along a line, Y=10, of the conventional progressive power lens. As shown in FIG. 13, the absolute value of the minimum sectional refracting power direction θ (unit: degrees) representative of an inclination angle of a direction, in which the sectional surface power is minimum, with respect to the X-axis (i.e., a horizontal direction of the lens in an "as-worn" condition) exceeds 40 at most part. The sectional surface power is defined as follows:

$$D = 1000(n'-n)C,$$

where,

D represents a sectional surface power;

n' represents a refractive index of medium on a rear side of the surface;

n represents a refractive index of medium in front of the surface; and c represents curvature of the sectional surface.

As above, when a shallow base curve is used, and the progressive power surface along the main meridian is formed to be umbilical meridian, the astigmatism resides on the main meridian, and the clear vision area becomes relatively narrow.

In order to deal with the above problem, there are lenses which are formed such that the shape along the main meridian is not a row of umbilical points. Examples of such progressive power lenses are disclosed in Japanese Patent Provisional Publications No. SHO59-58415, No. HEI 01-22172, No. HEI 08-136868 and published Japanese translations of PCT international publication for patent application No. HEI 04-500870.

If the progressive power lens is formed such that the main meridian is not a row of umbilical points as described in the above publications, even if a shallow base curve is employed, the astigmatism on the main meridian is well suppressed. However, in the above-described publications, only a structure in the vicinity of the main meridian is disclosed. Therefore, although the astigmatism on the main meridian is well suppressed, the other problem of a relatively narrow clear vision area in the distance portion cannot be solved.

SUMMARY OF THE INVENTION

The present invention is advantageous in that a relatively wide clear vision area can be provided in the distance portion even though a shallow base curve is used for the progressive power surface.

According to an embodiment of the invention, an improved progressive power spectacle lens is provided. The progressive power spectacle lens has a progressive power surface on at least one of a front surface and a back surface of the spectacle lens. The progressive power surface includes a distance portion corresponding to a long-distance view, a near portion corresponding to a short-distance view and an intermediate portion between the distance portion and the near portion, a refracting power gradually changes in the intermediate portion between the distance portion and the near portion.

In such a spectacle lens, a shape of the progressive power surface along a main meridian is formed not to be umbilical, and the distance portion is formed to include an area where quantity of surface astigmatism decreases from a position on the main meridian to a predetermined position farther from the main meridian in the horizontal direction, the surface astigmatism then increasing at positions farther, in the horizontal direction, from the predetermined position.

With the above configuration, a relatively thin progressive power spectacle lens having a relatively wide clear vision area in the distance portion can be provided.

optionally, a spherical power of the spectacle lens is negative.

Still optionally, for y satisfying 5≦y<20, a condition:

$$AS(0,y)>0.2$$

is satisfied, where AS(x, y) represents quantity (unit: diopter) of surface astigmatism at a position (x, y), X and y being values on X and Y coordinate axes, respectively, an origin of the XY coordinate system being a fitting point of the spectacle lens, and for a combination of x and y satisfying 5≦y<20 and 10<|x|<30, a condition:

$$AS(0,y)-AS(x,y)>0.1$$

is satisfied.

Further optionally, for y satisfying 5≦y<20, conditions:

$$AS(0,y)>0.2,$$

$$AS(\pm 30,y)>0.2,$$

$$20<|\theta(\pm 15,y)|<40, \text{ and}$$

$$0<|\theta(\pm 25,y)|<20,$$

are satisfied, where θ(x, y) represents the minimum sectional surface power direction θ at coordinates of x and y.

BRIEF DESCRIPTION OF THE ACCOMPANYING DRAWINGS

Figure 1:
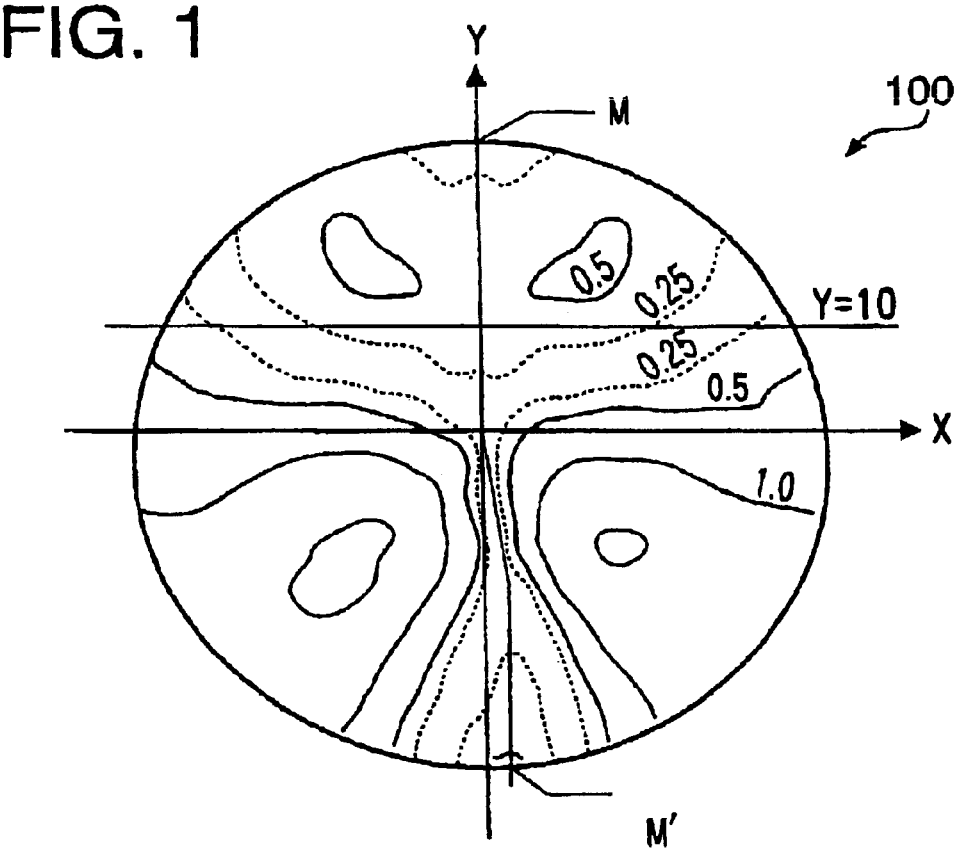
Figure 2:
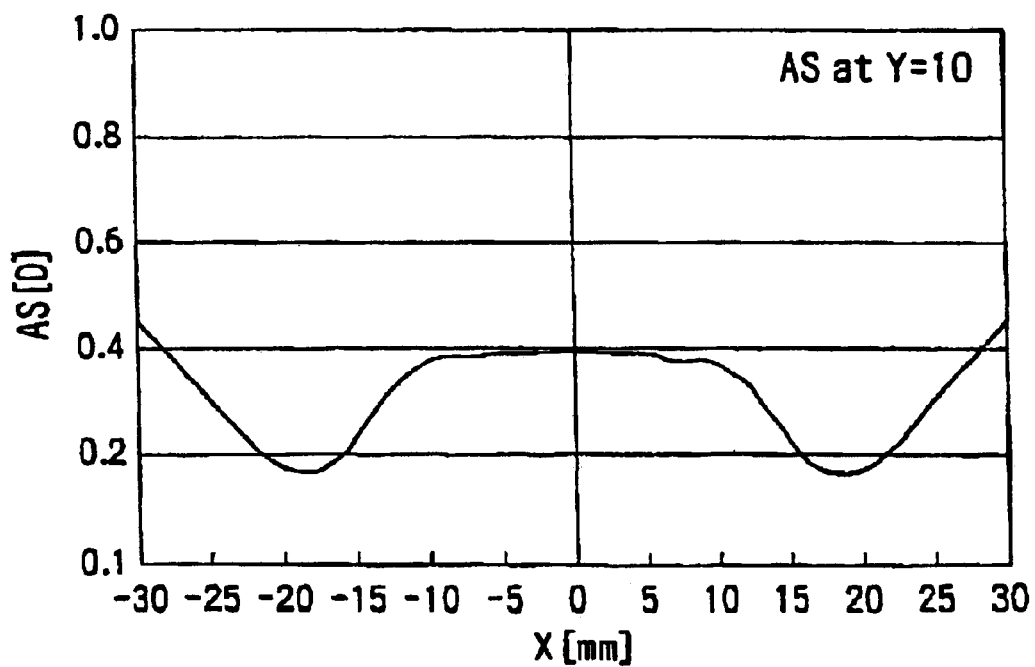
Figure 3:
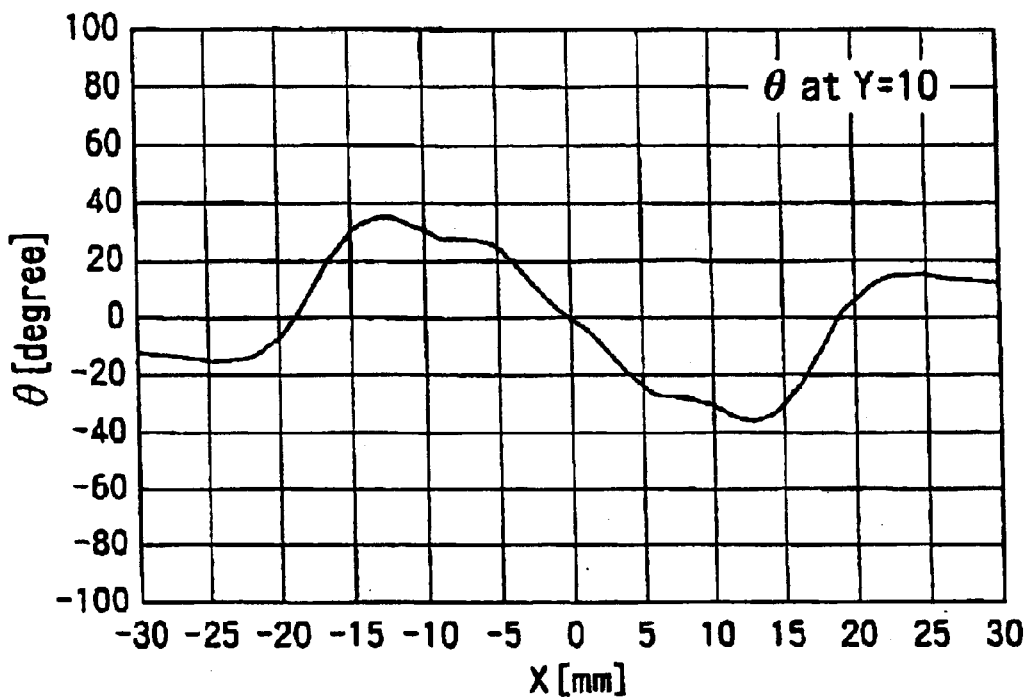
Figure 4:
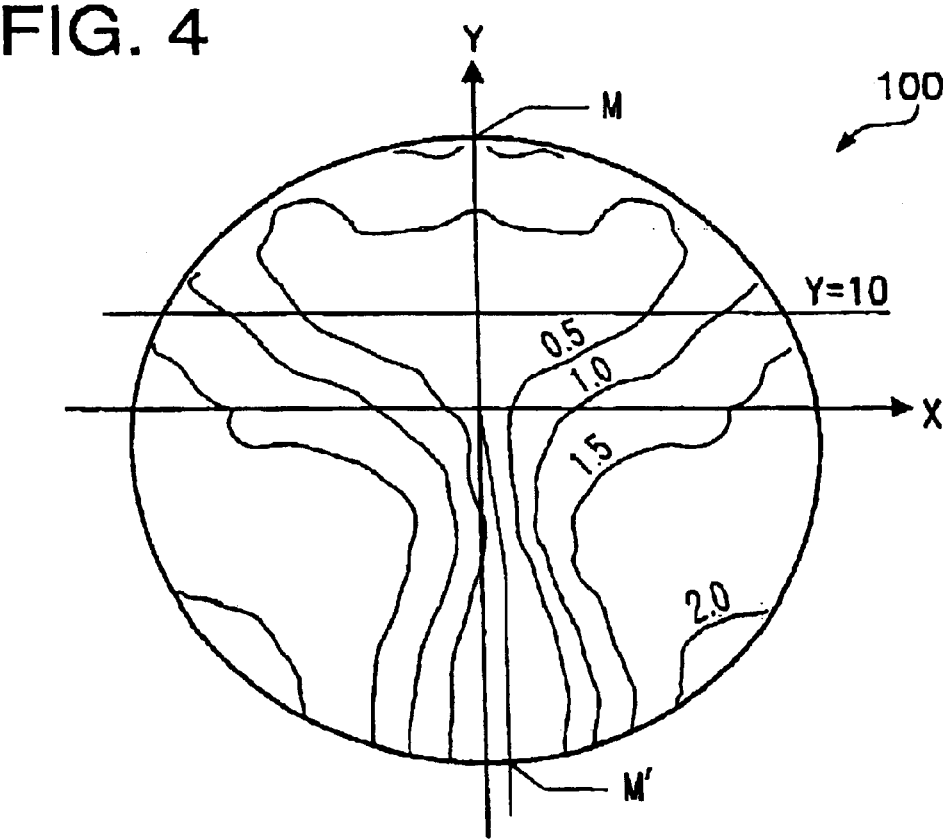
Figure 5:
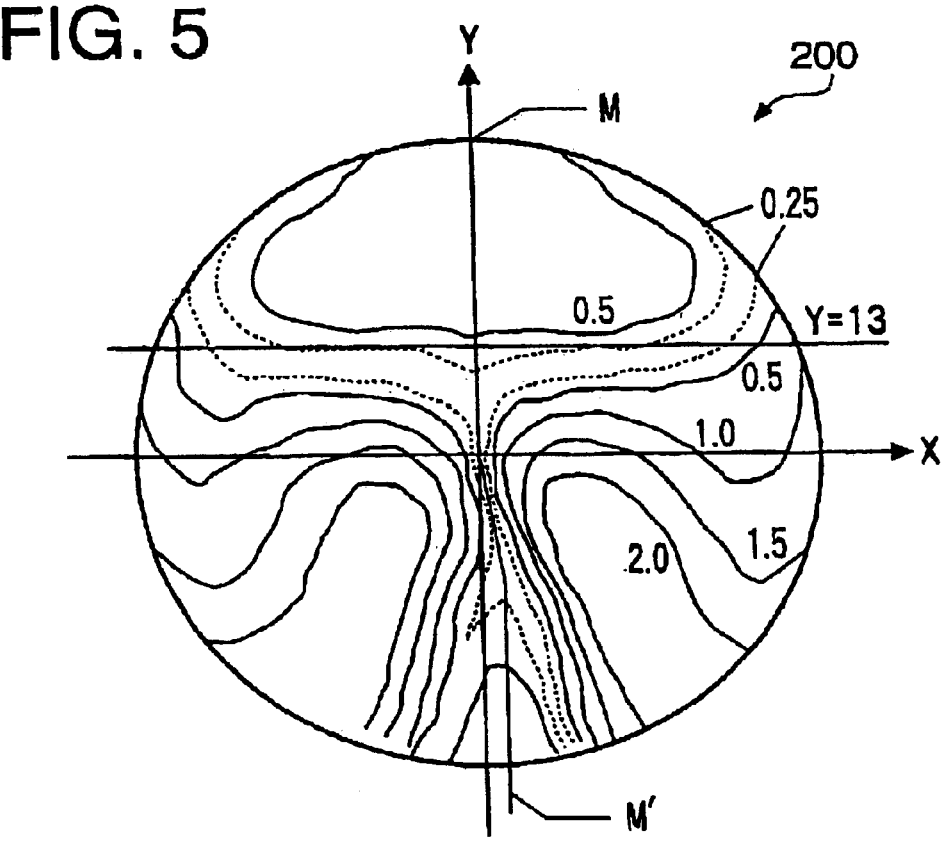
Figure 6:
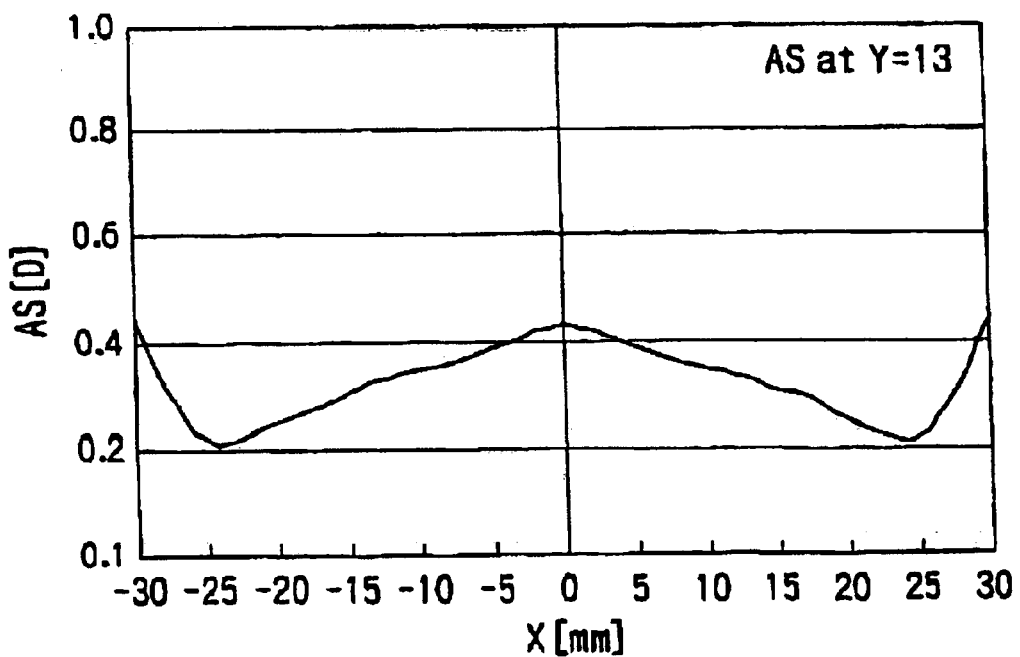
Figure 7:
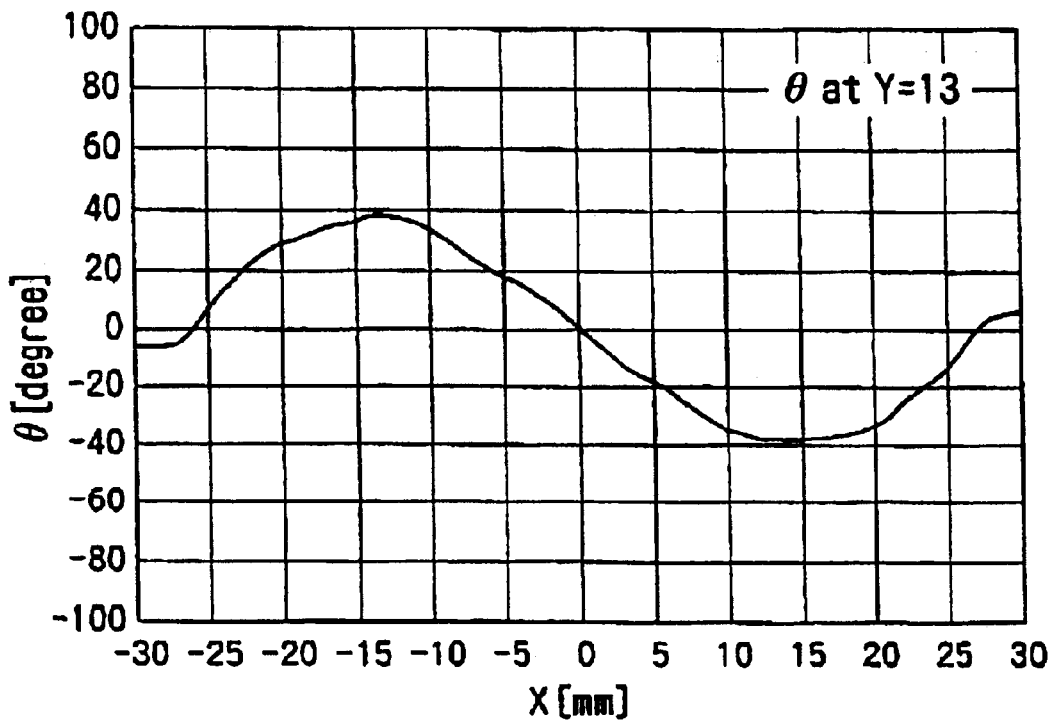
Figure 8:
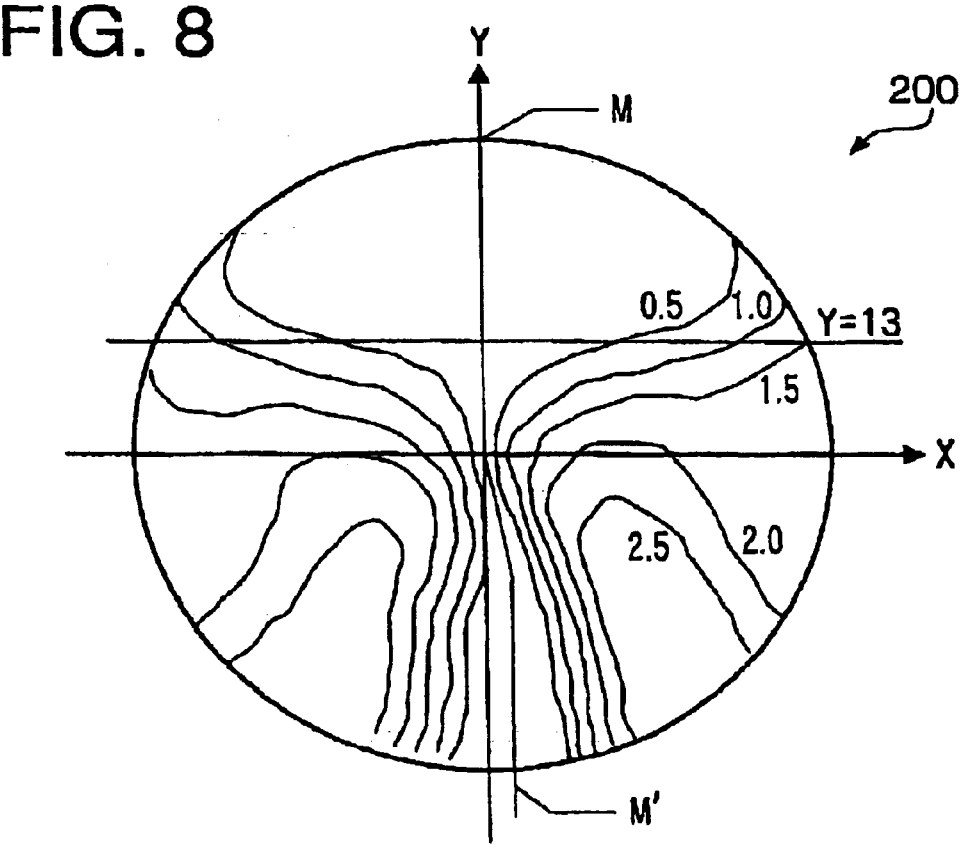
Figure 9:
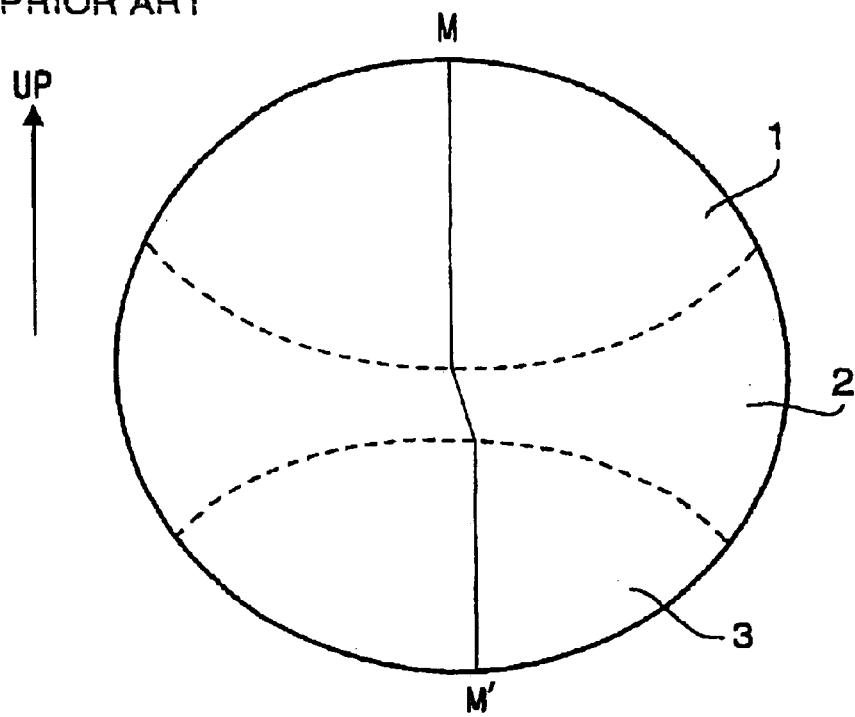
Figure 10:
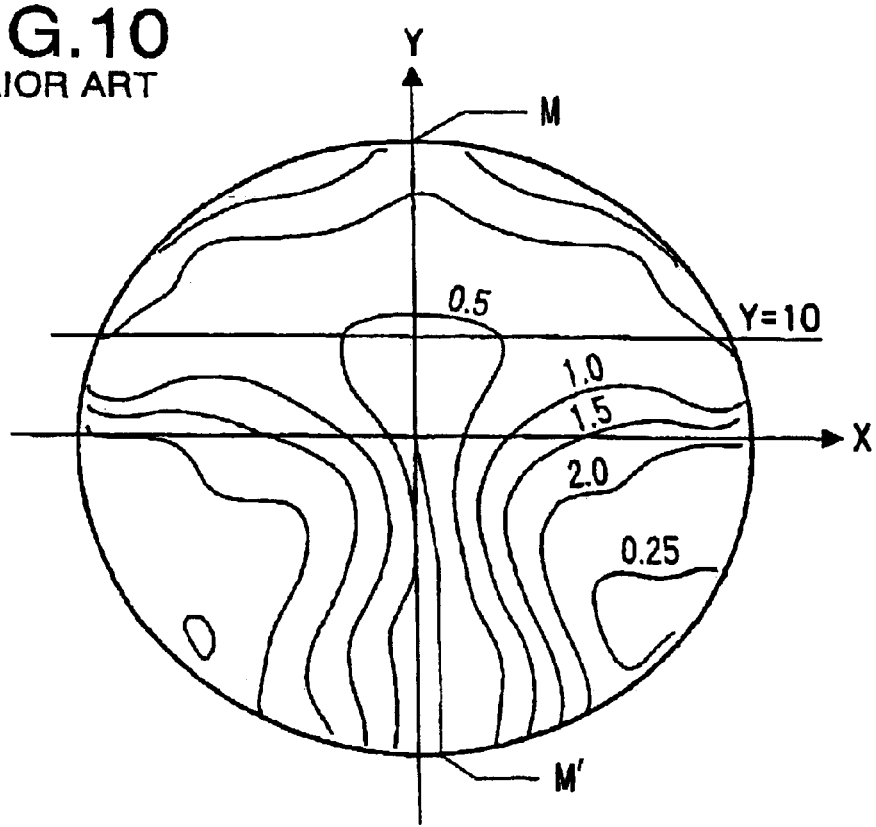
FIG. 10 shows a distribution of transmissive astigmatism of the above-described progressive power lens. As understood from FIG. 10, astigmatism is generated on the main meridian MM', and a clear vision area where the astigmatism is 0.5D or lower exists only in a narrow area from the lower part of the distance portion to the near portion.
Figure 11:
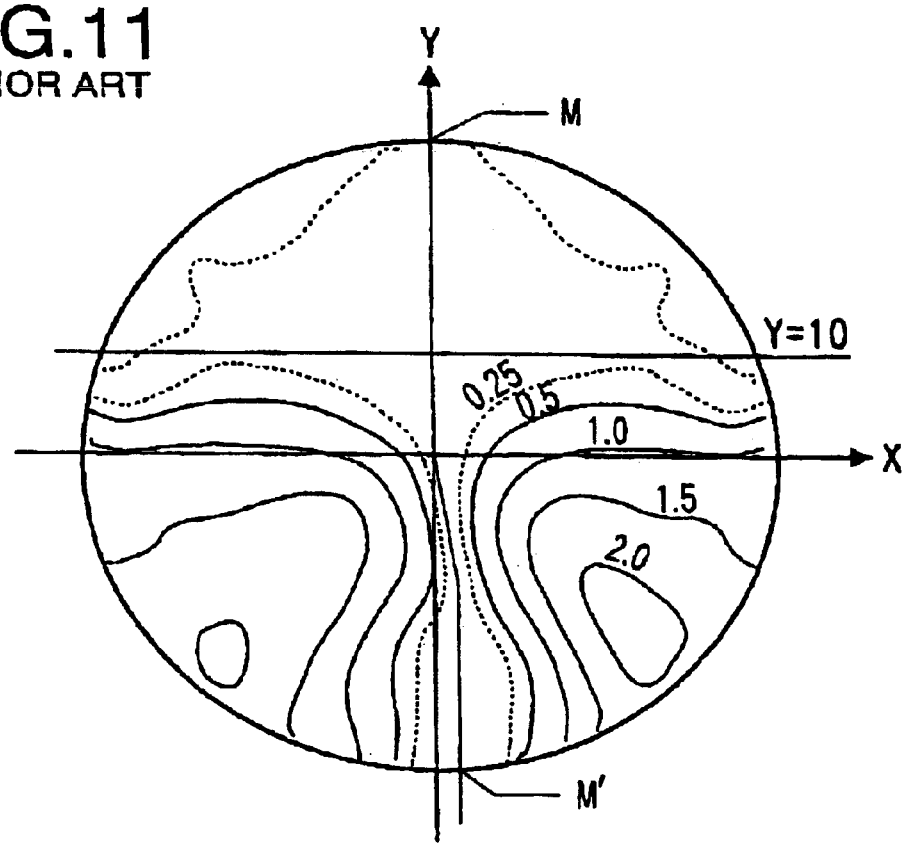
FIG. 11 shows a distribution of surface astigmatism of this conventional lens.
Figure 12:
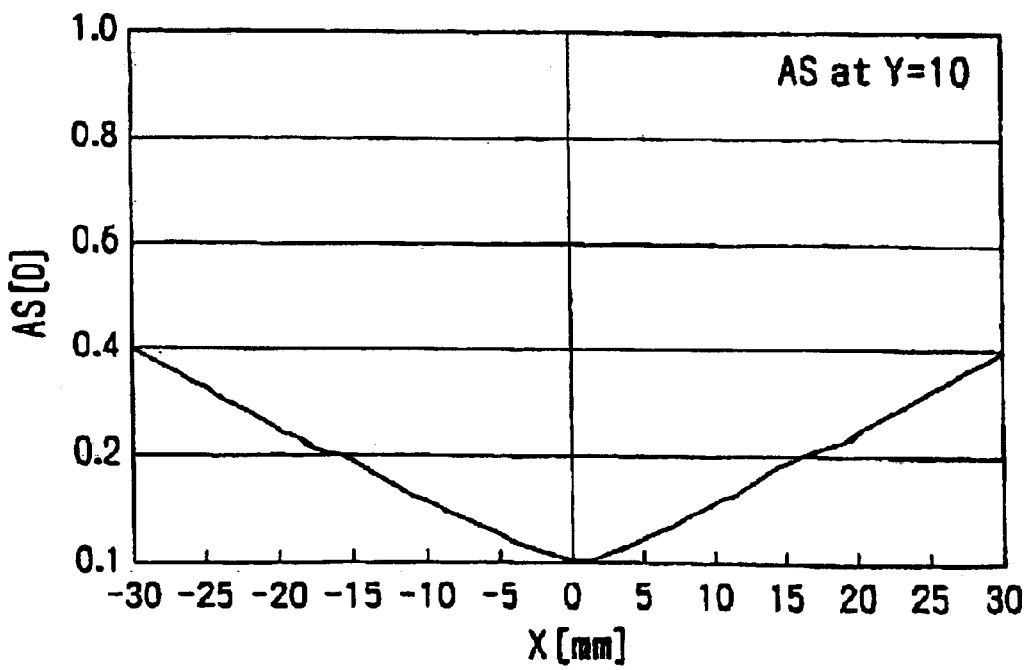
FIG. 12 shows (which is also understood from FIG. 11) that the surface astigmatism increases at a portion farther from the main meridian MM' in the horizontal direction (X-axis direction).

FIG. 1 shows a distribution of surface astigmatism on a progressive power surface of a spectacle lens according to a first embodiment of the invention;

FIG. 2 is a graph showing a variation of the surface astigmatism along a line of Y=10 of the spectacle lens according to the first embodiment;

FIG. 3 is a graph showing a variation of a minimum sectional refracting power direction along a line of Y=10 of the spectacle lens according to the first embodiment;

FIG. 4 shows a distribution of astigmatism of the progressive power spectacle lens according to the first embodiment;

FIG. 5 shows a distribution of surface astigmatism on a progressive power surface of a spectacle lens according to a second embodiment of the invention;

FIG. 6 is a graph showing a variation of the surface astigmatism along a line of Y=13 of the spectacle lens according to the second embodiment;

FIG. 7 is a graph showing a variation of the minimum sectional refracting power direction along a line of Y=13 of the spectacle lens according to the second embodiment;

FIG. 8 shows a distribution of astigmatism of the progressive power spectacle lens according to the second embodiment;

FIG. 9 schematically shows a configuration of a progressive power spectacle lens;

FIG. 10 shows a distribution of astigmatism of a conventional progressive power spectacle lens;

FIG. 11 shows a distribution of surface astigmatism on a progressive power surface of the conventional spectacle lens;

FIG. 12 is a graph showing a variation of the surface astigmatism long a line of Y=10 of the conventional spectacle lens; and FIG. 13 is a graph showing a variation of minimum sectional refracting power direction along a line of Y=10 of the conventional spectacle lens.

DETAILED DESCRIPTION OF THE EMBODIMENTS

Hereinafter, progressive power spectacle lenses according to embodiments of the invention will be described with reference to the accompanying drawings.

First Embodiment

According to a first embodiment, a progressive power spectacle lens (hereinafter simply referred as a spectacle lens) 100 is configured such that the SPH is −4.00D and addition power is 2.00D. The outer surface (i.e., an object side surface) of the spectacle lens 100 is formed to be the progressive power surface, a base curve of which is 2.00D. Further, the main meridian is formed to be a non-umbilical meridian (i.e., a row of successive non-umbilical points).

FIG. 1 shows a distribution of surface astigmatism on a progressive power surface of the spectacle lens 100. In FIG. 1, an XY coordinate system is employed, where an origin (an intersection of X- and Y-axes) coincides with a fitting point of the spectacle lens 100, and a direction in which the X-axis extends is a horizontal direction in an as-worn condition of the spectacle lens 100.

Contour lines indicate the astigmatism levels. As is understood from FIG. 1, surface astigmatism exceeding 0.2D is provided on the main meridian MM' in a distance portion. Further, in the distance portion, the surface astigmatism once decreases and then increases as a distance, in the X-axis direction, from the main meridian MM' increases.

FIG. 2 is a graph showing a variation of the surface astigmatism along a line of Y=10 of the spectacle lens 100. As shown in FIG. 2, within a range of |X|≦±10 [mm], astigmatism is approximately 0.4D. For greater values of |X|, the surface astigmatism decreases and the surface astigmatism has the minimum values (approximately 0.17D) at X=±18 [mm]. For greater values of |X|, the surface astigmatism increases again.

Further, according to the first embodiment, the minimum sectional refracting power direction θ (an inclination, with respect to the X-axis, of a direction in which the sectional refracting power is smaller) varies along the line of Y=10 as shown in FIG. 3. As indicated in FIG. 3, for X=±13, the absolute value of the minimum sectional refracting power direction θ is approximately 35 degrees, and for X<-25 or X>25, the minimum sectional refracting power direction θ is approximately 20 degrees or lower.

FIG. 4 shows a distribution of transmissive astigmatism of the spectacle lens 100 according to the first embodiment. By comparing FIG. 4 and FIG. 10 (the distribution of the transmissive astigmatism of the conventional lens), it is apparent that, according to the first embodiment, a wide clear vision area is provided in the distance portion.

As described above, by providing, in the distance portion, an area where the surface astigmatism once decreases and then increases as a distance, in the X-axis direction, from the main meridian MM' increases, even though a relatively shallow curve is used, a progressive power lens having a wide clear vision area in the distance portion can be obtained.

It should be noted that, in the above-described embodiment, the spectacle lens 100 is configured such that the SPH is −4.00D and the addition power is 2.00D. For different specification of the lens, a degree of depth of the base curve may be different, and a deeper base curve may be necessary depending on the specification.

According to numerical analysis, it is confirmed that, if both of the following conditions (1) and (2) are satisfied, even though the shallow base curve is employed, a relatively wide clear vision area can be obtained in the distance portion.

The conditions to be satisfied are:
for y satisfying 5≦y<20, $$AS(0,y) > 0.2 \tag{1, and}$$

for a combination of x and y satisfying 5≦y<20 and 10<|x|<30, $$AS(0,y) - AS(x,y) > 0.1 \tag{2},$$

where, y is a value of Y coordinate, x is a value of an X coordinate, and AS(x, y) represents the surface astigmatism at coordinates of x and y.

It is also confirmed based on the numerical analysis that, if the following conditions (3)–(6) are satisfied, quantity of distortion is well balanced over the entire lens.

The conditions are:
for y satisfying 5≦y<20, $$AS(0,y) > 0.2 \tag{3}$$

$$AS(\pm 30,y) > 0.2 \tag{4}$$

$$20 < |\theta(\pm 15,y)| < 40 \tag{5}$$

$$0 < |\theta(\pm 25,y)| < 20 \tag{6}$$

where θ(x, y) represents the minimum sectional surface power direction θ at coordinates of x and y.

Second Embodiment

According to a second embodiment, a progressive power spectacle lens (hereinafter simply referred as a spectacle lens) 200 is configured such that the SPH is −4.00D and addition power is 3.00D. The inner surface (i.e., an eye side surface) of the spectacle lens 200 is formed to be the progressive power surface, a base curve of which is 2.70D Further, the main meridian is formed to be a non-umbilical meridian.

FIG. 5 shows a distribution of surface astigmatism on a progressive power surface of the spectacle lens 200.

Contour lines indicate the astigmatism levels. As is understood from FIG. 5, surface astigmatism exceeding 0.2D is provided on the main meridian MM' in a distance portion. Further, in the distance portion, the surface astigmatism once decreases and then increases as a distance, in the X-axis direction, from the main meridian MM' increases.

FIG. 6 is a graph showing a variation of the surface astigmatism along a line of Y=13 of the spectacle lens 200.

As shown in FIG. 6, on the main meridian MM', astigmatism is approximately 0.44D. For greater values of |X|, the surface astigmatism decreases and the surface astigmatism has the minimum values (approximately 0.21D) at X=±24 [mm]. For greater values of |X|, the surface astigmatism increases again.

Further, according to the second embodiment, the minimum sectional refracting power direction θ (an inclination, with respect to the X-axis, of a direction in which the minimum sectional refracting power is smaller) varies along the line of Y=13 as shown in FIG. 7. As indicated in FIG. 7, for X=±14, the absolute value of the minimum sectional refracting power direction θ is approximately 38 degrees, and for X<-25 or X>25, the minimum sectional retracting power direction θ is approximately 20 degrees or lower.

FIG. 8 shows a distribution of transmissive astigmatism of the spectacle lens 200 according to the second embodiment. It is appreciated that, according to the second embodiment, a wide clear vision area is provided in the distance portion.

Regardless whether the progressive power surface is an outer surface or an inner surface, by providing, in the distance portion, an area where the surface astigmatism once decreases and then increases as a distance, in the X-axis direction, of the main meridian MM' increases, even though a relatively shallow curve is used, a progressive power lens having a wide clear vision area in the distance portion can be obtained.

It should be noted that, in the second embodiment, the spectacle lens 200 is configured such that the SPH is −4.00D and the addition power is 3.00D. For different specification of the lens, a degree of depth of the base curve may be different, and a deeper base curve may be necessary depending on the specification.

Similarly to the first embodiment, it is confirmed that, if both of the following conditions (1) and (2) are satisfied, even though the shallow base curve is employed, a relatively wide clear vision area can be obtained in the distance portion.

The conditions to be satisfied are:
for y satisfying 5≦y<20, $$AS(0,y) > 0.2 \tag{1; and}$$

for a combination of x and y satisfying 5≦y<20 and 10<|x|<30, $$AS(0,y) - AS(x,y) > 0.1 \tag{2},$$

where, y is a value of Y coordinate, x is a value of an X coordinate, and AS(x, y) represents the surface astigmatism at coordinates of x and y.

It is also confirmed based on the numerical analysis that, if the following conditions (3), (4), (5) and (6) are satisfied, quantity of distortion is well balanced over the entire lens.

The conditions are:
for 5≦y<20, $$AS(0,y) > 0.2 \tag{3;}$$

$$AS(\pm 30,y) > 0.2 \tag{4;}$$

$$20 < |\theta(\pm 15,y)| < 40 \tag{5; and}$$

$$0 < |\theta(\pm 25,y)| < 20 \tag{6},$$

where θ(x, y) represents the minimum sectional surface power direction θ at coordinates of x and y.

The present disclosure relates to the subject matter contained in Japanese Patent Application No. 2002-000268, filed on Jan. 7, 2002, which is expressly incorporated herein by reference in its entirety.

What is claimed is:

1. A progressive power spectacle lens having a progressive power surface on at least one of a front surface and a back surface of the spectacle lens, the progressive power surface including a distance portion corresponding to a long-distance view, a near portion corresponding to a short-distance view and an intermediate portion between the distance portion and the near portion, a refracting power gradually changes in the intermediate portion between the distance portion and the near portion, wherein a shape of the progressive power surface along a main meridian is not umbilical, and wherein the distance portion includes an area where quantity of surface astigmatism decreases from a position on the main meridian to a predetermined position farther from the main meridian in the horizontal direction, the surface astigmatism then increasing at positions farther, in the horizontal direction, from the predetermined position.

2. The spectacle lens according to claim 1, wherein a spherical power of the spectacle lens is negative.

3. The spectacle lens according to claim 2,
wherein for y within a range of $5 \leq y < 20$, a condition:

$$AS(0,y) > 0.2$$

is satisfied,
wherein $AS(x, y)$ represents quantity (unit: diopter) of surface astigmatism at a position $(x, y)$, x and y being values on X and Y coordinate axes, respectively, an origin of the XY coordinate system being a fitting point of the spectacle lens, and wherein for a combination of x and y satisfying $5 \leq y < 20$ and $10 < |x| < 30$, a condition:

$$AS(0,y) - AS(x,y) > 0.1$$

is satisfied.

4. The spectacle lens according to claim 3,
wherein for y within a range of $5 \leq y < 20$, conditions:

$$AS(0,y) > 0.2,$$

$$AS(\pm 30, y) > 0.2,$$

$$20 < |\theta(\pm 15, y)| < 40, \text{ and}$$

$$0 < |\theta(\pm 25, y)| < 20,$$

are satisfied,
wherein $\theta(x, y)$ represents the minimum sectional surface power direction $\theta$ at coordinates of x and y.

5. A progressive power spectacle lens having a progressive power surface on at least one of a front surface and a back surface of the spectacle lens, the progressive power surface including a distance vision portion corresponding to a long-distance view, a near vision portion corresponding to a short-distance view and an intermediate vision portion between the distance vision portion and the near vision portion, a refracting power in the intermediate portion being between the refracting power in the distance vision portion and in the near vision portion, the progressive power spectacle lens comprising:

the progressive power surface having a shape along a main meridian that is not umbilical; and the distance vision portion includes an area where a surface astigmatism amount decreases from a position on the main meridian to a predetermined position spaced from the main meridian in the horizontal direction, the surface astigmatism amount increasing at positions farther from the main meridian than the predetermined position in the horizontal direction.

6. The spectacle lens according to claim 5, wherein a spherical power of the spectacle lens is negative.

7. The spectacle lens according to claim 6 wherein:
for y within a range of $5 \leq y < 20$, the following relationship is satisfied:

$$AS(0,y) > 0.2$$

wherein $AS(x, y)$ represents quantity (unit: diopter) of surface astigmatism at a position $(x, y)$, x and y being values on X and Y coordinate axes, respectively, an origin of the XY coordinate system being a fitting point of the spectacle lens; and wherein for a combination of x and y satisfying $5 \leq y < 20$ and $10 < |x| < 30$, the following relationship is satisfied:

$$AS(0,y) - AS(x,y) > 0.1.$$

8. The spectacle lens according to claim 7 wherein:
for y within a range of $5 \leq y \leq 20$, the following relationships are satisfied:

$$AS(0y) > 0.2,$$

$$AS(\pm 30, y) > 0.2,$$

$$20 < |\theta(\pm 15, y)| > 40, \text{ and}$$

$$0 < |\theta(\pm 25, y)| < 20,$$

wherein $\theta(x, y)$ represents the minimum sectional surface power direction $\theta$ at coordinates of x and y.

* * * * *